(12) United States Patent
Matsumoto et al.

(10) Patent No.: US 8,181,190 B2
(45) Date of Patent: May 15, 2012

(54) OPTICAL DISC APPARATUS

(75) Inventors: Koji Matsumoto, Ichikawa (JP); Yosuke Ishizuka, Kawasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 706 days.

(21) Appl. No.: 12/256,496

(22) Filed: Oct. 23, 2008

(65) Prior Publication Data

US 2009/0113462 A1     Apr. 30, 2009

(30) Foreign Application Priority Data

Oct. 30, 2007   (JP) .................................. 2007-281943

(51) Int. Cl.
*G11B 17/04* (2006.01)
(52) U.S. Cl. ........................................ 720/613; 720/601
(58) Field of Classification Search .......... 720/601–613, 720/652–653
See application file for complete search history.

(56) References Cited

U.S. PATENT DOCUMENTS 7,600,235 B2 * 10/2009 Ide et al. ...................... 720/613

FOREIGN PATENT DOCUMENTS

| JP | 11-025666 | 1/1999 |
| JP | 2004-234803 | 8/2004 |

* cited by examiner

*Primary Examiner* — David Lam
(74) *Attorney, Agent, or Firm* — Antonelli, Terry, Stout & Kraus, LLP.

(57) ABSTRACT

In an optical disc apparatus, convex portions are provided on the inner surface of a top cover that covers the top surface side of the apparatus such that the convex portions are directly opposite or directly above a flexible printed circuit board during the slide-in/slide-out movements of a tray. The convex portions are positioned further outwardly from the outer circumference of an optical disc with respect to the rotation center of the optical disc upon completion of the slide-in movement of the tray. The convex portions guide or slide part of the flexible printed circuit board along the tip end surfaces of the convex portions in the direction of the slide-in movement of the tray when the part of the flexible printed circuit board comes into contact with the inner surface of the top cover during the slide-in movement of the tray.

6 Claims, 14 Drawing Sheets

FIG.8
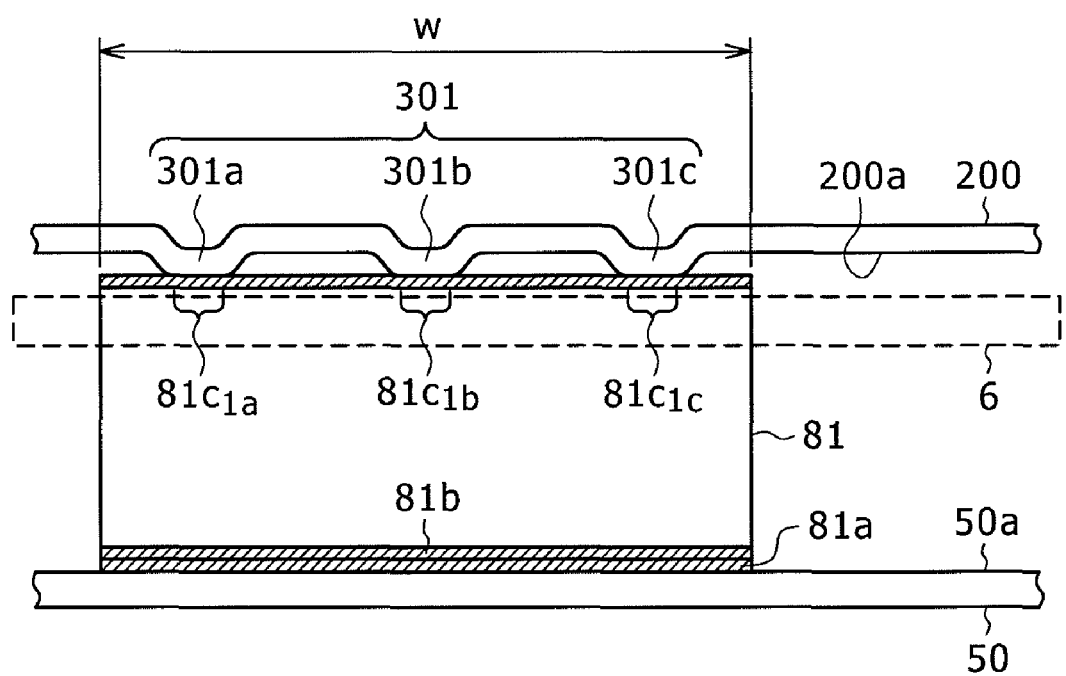
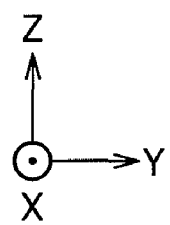

US 8,181,190 B2

OPTICAL DISC APPARATUS

CLAIM OF PRIORITY

The present application claims priority from Japanese patent application serial No. P2007-281943, filed on Oct. 30, 2007, the content of which is hereby incorporated by reference into this application.

BACKGROUND

1. Technical Field of the Invention

The present invention relates to an optical disc apparatus in which a tray is used to load an optical disc into and unload the disc from the apparatus, and more particularly to the top cover structure of the apparatus.

2. Description of the Related Art

Optical disc apparatuses such as those mounted on notebook personal computers have been developed with in mind further reduction in the thicknesses, weights, and costs of the apparatuses. In the optical disc apparatus in which a tray is used to load an optical disc into and unload the disc from the apparatus, a flexible printed circuit board is used to electrically connect a printed circuit board provided on a moving unit (a mechanical unit of the apparatus) which includes the tray to a printed circuit board provided on a fixed unit of the apparatus. In association with the objective of reduction in the thickness, weight, and costs of the optical disc apparatus, this flexible printed circuit board has also been under consideration for improving the operational reliability of the apparatus while maintaining the signal-processing capability of the flexible printed circuit board. Some of the related-art flexible printed circuit boards for such optical disc apparatuses are disclosed, for example, in Japanese Unexamined Patent Application Publication No. 2004-234803 (Patent Document 1) and Japanese Unexamined Patent Application Publication No. 11-25666 (Patent Document 2). Disclosed in Patent Document 1 are two configurations of a recording/reproducing device. One is a configuration in which a substantially U-shaped (when extended over a plane) flexible printed circuit board is used as the printed circuit board to be connected to the moving unit that supports a recording medium, and a coverlay is glued onto the distal end of one of the two arms (second arm) of the U-shaped board which end is connected to the connector of the moving unit in order to increase the rigidity of the distal end relative to that of the proximal potion of the second arm so that the flexible printed circuit board does not slacken downward further from the clearance formed between the housing of the apparatus and the disc tray (moving unit) when the disc tray is ejected from the apparatus. The other is a configuration in which the region within the second arm which bends during the movement of the moving unit is formed thinner than the other regions of the second arm so that a load on that region is reduced during bending. Patent Document 2 discloses a configuration in which, for the purpose of preventing the degradation of transmission signal waveforms by reducing the capacitance produced between the contact portion of a flexible printed circuit board 17 for connecting an optical pickup and another printed circuit board and that of a metal cover 32, concave and convex portions 41 are provided on the metal cover 32 to reduce its contact area with the flexible printed circuit board 17.

SUMMARY

The reduction in the thickness of an optical disc apparatus involves reducing the internal height dimensions of the apparatus as well as reducing its external dimensions. In an optical disc apparatus the internal height dimensions of which are reduced, the flexible printed circuit board for connecting a printed circuit board provided on the moving unit of the apparatus which includes a tray to a printed circuit board provided on the fixed unit of the apparatus partially comes into contact with the inner opposing surface of the top cover of the apparatus during the slide-in movement of the tray into the housing of the apparatus (the phrase 'partially comes into contact with' means that part of the moving portion of the flexible printed circuit board comes into contact with the inner surface of the top cover). At this time, the flexible printed circuit board slackens to a great extent toward the bottom case side of the apparatus due to the frictional force caused by the above-mentioned contact and to the positional displacement of the tray. Accordingly, part of the slack of the flexible printed circuit board hangs between the bottom cover of the moving unit and the bottom case of the apparatus and consequently may be caught between them, which may result in a stop of the slide-in movement of the tray.

With reference now to FIGS. 10 to 14, the structure of a conventional thin optical disc apparatus 100' and the states of the apparatus during the slide-in movement of a tray 6' are described. FIG. 10 is a diagram illustrating the structure of the top surface side (the disc-placing-surface side, or the +Z-directional side) of the optical disc apparatus 100', illustrating in perspective the tray 6' slid out of the housing of the apparatus which is composed of a bottom case 50' and a top cover 200'. FIG. 11 is a diagram illustrating the apparatus without the top cover 200'. FIG. 12 is a perspective view illustrating the structure of the bottom surface side (the −Z-directional side) of the optical disc apparatus 100'. FIGS. 13A to 13C are diagrams illustrating the states of a flexible printed circuit board 80' of the apparatus during the slide-in movement of the tray 6'. FIG. 14 is a diagram illustrating the contact between the flexible printed circuit board 80' and the inner surface of the top cover 200' during the slide-in movement of the tray 6'.

In the optical disc apparatus 100' shown in FIGS. 10 and 11, a mechanical unit (moving unit) of the apparatus has an optical pickup 4', a pickup transfer mechanism, and a disc motor 3', all mounted on the chassis 5' of the unit. Also shown in those figures are a turntable 3a' on which an optical disc (not illustrated) is placed; a damper 3b' for holding the optical disc with the damper 3b' inserted into the central hole of the optical disc; a flexible printed circuit board 8' (often abbreviated to 'FPC') for connecting the optical pickup 4' and a printed circuit board (not illustrated) on the chassis 5'; a bottom case 50' that covers the bottom surface side (the −Z-directional side) of the apparatus; and a rail member 51' which slidably engages with the outer side of a side end of the tray 6' and moves in the ±X directions with the slide-in/slide-out movements of the tray 6'. Also, as shown in FIG. 11, on the inner flat surface 50a' of the bottom case 50' are installed a main printed circuit board 85' of the apparatus; the flexible printed circuit board 80' that connects the main printed circuit board 85' and another printed circuit board (not illustrated) on the mechanical unit; and the like. This flexible printed circuit board 80' is U-shaped when extended over a plane, and a portion 80a' of the U-shaped flexible printed circuit board 80' is fixed to the inner face 50a' of the bottom case 50'. The rest portion of the U-shaped board 80', a portion 80c', moves and changes its shape during the slide-in/slide-out movements of the tray 6' into/out of the apparatus. The portion 80a' has its proximal end connected to the main printed circuit board 85' via a connector 90'. In a folded state, the portion 80c' of the flexible printed circuit board 80' has its distal end connected via a connector (not illustrated) to a printed circuit board on the chassis $5'$ of the mechanical unit. The disc motor $3'$ is attached to the chassis $5'$ via a motor fixing plate (not illustrated) that is fixed to the bottom surface (the surface facing the −Z direction) of the chassis $5'$, and the chassis $5'$ is coupled to the tray $6'$ via, for example, vibration insulators. Provided below the motor fixing plate (in the −Z direction) is a bottom cover (not illustrated) fixed to the tray $6'$. During the slide-in/slide-out movements of the tray $6'$ with respect to the bottom case $50'$ of the apparatus, this bottom cover moves together with the tray $6'$ above the portion $80a'$ of the flexible printed circuit board $80'$ with a predetermined clearance provided between the bottom cover and the bottom case $50'$. Reference numeral $10'$ denotes a front panel fixed to the tray $6'$.

FIG. 12 illustrates the structure of the bottom surface side (the −Z-directional side) of the optical disc apparatus $100'$ when the apparatus is in the state shown in FIGS. 10 and 11, that is, when the tray $6'$ is slid out of the housing (the bottom case $50'$ and the top cover $200'$) of the apparatus. When viewed from the bottom side of the optical disc apparatus $100'$, as shown in FIG. 12, a clearance $120'$ having an X-axis directional dimension $x_g'$ is formed between an end surface $501'$ of the bottom case $50'$ and an end surface $401'$ of a bottom cover $40'$. Part of the portion $80c'$ of the flexible printed circuit board $80'$ can been seen exposed from the clearance $120'$.

FIG. 13A to 13C illustrate the states of the flexible printed circuit board $80'$ of the optical disc apparatus $100'$ when the tray $6'$ is slid into the apparatus. Specifically, FIG. 13A shows the state of the flexible printed circuit board $80'$ immediately after the tray $6'$ starts to be slid into the apparatus; FIG. 13B shows its state when the tray $6'$ is being slid into the apparatus; and FIG. 13C shows its state when the tray $6'$ is slid further into the apparatus. In those figures, reference numerals $60'$, $86'$, and $91'$ respectively denote a motor fixing plate, a printed circuit board fixed to the chassis $5'$ of the mechanical unit, and a connector.

In the state shown in FIG. 13A, or immediately after the tray $6'$ starts to be slid in the A direction together with the mechanical unit, the portion $80c'$ (already shown in FIG. 11) of the flexible printed circuit board $80'$ changes its shape into a curvature with the positional displacement of the tray $6'$. Also, a portion $80c_1'$ of the portion $80c'$ comes into contact with the inner surface $200a'$ of the top cover $200'$ at a position $C_{2a}'$ which is away from the X-directional end surface $200t'$ of the top cover $200'$ by a distance of $x_{2a}'$. As shown in FIG. 13A, the part of the portion $80c'$ of the flexible printed circuit board $80'$ which is closer to the connector $90'$ than the portion $80c_1'$ is represented by $80c_2'$, and the part of the portion $80c'$ of the flexible printed circuit board $80'$ which is closer to the connector $91'$ than the portion $80c_1'$ is represented by $80c_3'$. In the state of FIG. 13A, when the portion $80c_1'$ of the flexible printed circuit board $80'$ is in contact with the inner surface $200a'$ of the top cover $200'$, the portion $80c_3'$ is pushed from the connector-$91'$ side with the positional displacement of the tray $6'$ and changes its shape, which causes a force $F_{2a1}'$ having an angle of $\theta_a'$ to act on the portion $80c_1'$. Thus, the portion $80c_1'$ is in contact with the inner surface $200a'$ of the top cover $200'$ at the position $C_{2a}'$ with the force $F_{2a1}'$ applied to the portion $80c_1'$. As shown in FIG. 14, the contact area between the portion $80c_1'$ and the inner surface $200a'$ takes up the whole of the width w' of the portion $80c_1'$ of the flexible printed circuit board $80'$. Therefore, a large frictional force results between the portion $80c_1'$ and the inner surface $200a'$. At this time, the portion $80c_1'$ also receives a reactive force due to the frictional force, and a force $F_{2a2}'$ due to this reactive force, in turn, acts on the portion $80c_3'$. Accordingly, with the movement of the tray $6'$, the part of the portion $80c_3'$ which is closer to the portion $80c_1'$ is hindered from moving in the −X direction by the force $F_{2a2}'$. In the meantime, part of the portion $80c_3'$ which is closer to the connector $91'$ is displaced in the −X direction with the movement of the tray $6'$. As a result, the portion $80c_3'$ slackens in the −Z direction between the part of the portion $80c_3'$ which is closer to the portion $80c_1'$ and the part of the portion $80c_3'$ which is closer to the connector $91'$ with the slide-in movement of the tray $6'$ (−X-directional movement). This slack increases with the further progress of the tray $6'$; however, the amount of the slack in the state of FIG. 13A is still not large to such an extent that part of the slack protrudes from the clearance $120'$ (an X-axis directional dimension $x_{ga}'$) between the end surface $501'$ of the bottom case $50'$ and the end surface $401'$ of the bottom cover $40'$.

The slide-in movement of the tray $6'$ progresses with the portion $80c_1'$ of the portion $80c'$ of the flexible printed circuit board $80'$ in contact with the inner surface $200a'$ of the top cover $200'$. After the slide-in movement of the tray $6'$ progresses up to the state shown in FIG. 13B, the portion $80c_1'$ of the flexible printed circuit board $80'$ then comes into contact with the inner surface $200a'$ of the top cover $200'$ at a position $C_{2b}'$ which is away from the X-directional end surface $200t'$ of the top cover $200'$ by a distance of $x_{2b}'$. This means that, with the positional displacement of the tray $6'$, the position of the portion $80c_1'$ changes not only in the portion $80c'$ but also relative to the top cover $200'$. The above-mentioned distance $x_{2b}'$ is larger than the distance $x_{2a}'$ shown in FIG. 13A; note however that the difference between distance $x_{2b}'$ and distance $x_{2a}'$ decreases with increase in the frictional force between the portion $80c_1'$ and the inner surface $200a'$ of the top cover $200'$ because the slide of the portion $80c_1'$ along the inner surface $200a'$ is suppressed. In the state of FIG. 13B, or when the portion $80c_1'$ of the flexible printed circuit board $80'$ is in contact with the inner surface $200a'$ of the top cover $200'$ at the position $C_{2b}'$, the portion $80c_3'$ changes its shape to a greater extent than in FIG. 13A, which causes a force $F_{2b1}'$ at an angle of $\theta_b'$ ($\theta_b' > \theta_a'$) to act on the portion $80c_1'$. In other words, the portion $80c_1'$ is in contact with the inner surface $200a'$ of the top cover $200'$ at the position $C_{2b}'$ with the force $F_{2b1}'$ applied to the portion $80c_1'$. As shown in FIG. 14, because the contact area between the portion $80c_1'$ and the inner surface $200a'$ of the top cover $200'$ takes up the whole of the width w' of the portion $80c_1'$ of the flexible printed circuit board $80'$, as in the contact at the position $C_{2a}'$ of FIG. 13A, a large frictional force results between the portion $80c_1'$ and the inner surface $200a'$, as can be expected. At this time, the portion $80c_1'$ also receives a reactive force due to the frictional force, and a force $F_{2b2}'$ due to this reactive force, in turn, acts on the portion $80c_3'$. Accordingly, with the progress of the tray $6'$, the force $F_{2b2}'$ temporarily hinders part of the portion $80c_3'$ which is closer to the portion $80c_1'$ from moving in the −X direction. In the meantime, part of the portion $80c_3'$ which is closer to the connector $91'$ is displaced in the −X direction with the movement of the tray $6'$. As a result, the portion $80c_3'$ slackens in the −Z direction between the part of the portion $80c_3'$ which is closer to the portion $80c_1'$ and the part of the portion $80c_3'$ which is closer to the connector $91'$. The amount of this slack of the portion $80c_3'$ is yet larger than that in FIG. 13A; thus, in the state of FIG. 13B, a portion $80c_{3t}'$ of the slack protrudes from the clearance $120'$ (an X-axis directional dimension $x_{gb}'$) between the end surface $501'$ of the bottom case $50'$ and the end surface $401'$ of the bottom cover $40'$.

After the slide-in movement of the tray $6'$ further progresses up to the state shown in FIG. 13C, the slack portion $80c_{3t}'$ of the portion $80c_3'$ of the flexible printed circuit board $80'$ is caught between the upper surface of the bottom case $50'$ and the lower surface of the bottom cover $40'$. In the above state, the tray 6' stops its slide-in movement at that position, which makes it impossible to load an optical disc 2' to a predetermined position inside the apparatus and recording/reproducing operations of the optical disc apparatus 100'. Also, the flexible printed circuit board 80' itself may be damaged, which may result in disconnections of its internal conductors. If the flexible printed circuit board 80' is high in rigidity and low in flexibility, the frictional force between the flexible printed circuit board 80' and the inner surface 200a' of the top cover 200 easily increases, and so does the −Z-directional slack of the flexible printed circuit board 80' The rigidity of the flexible printed circuit board 80' increases when the board 80' is thicker, wider, or made of harder material. Generally speaking, a low-cost flexible printed circuit board is higher in rigidity and lower in flexibility.

As mentioned above, the related-art flexible printed circuit board disclosed in Patent Document 1 is approximately U-shaped when extended over a place, and the second arm on the moving side of the flexible printed circuit board is formed to have a high-rigidity region and low-rigidity regions. In fact, this structure of the flexible printed circuit board is complex and may result in higher manufacturing costs. Further, the art of Patent Document 2 described above is intended to reduce the contact area between the flexible printed circuit board 17 and the metal cover 32 when the disc reproducing apparatus is playing an optical disc and thereby to reduce the capacitance produced over the contact area. Therefore, the art of Patent Document 2 is not necessarily intended to prevent hanging of the slack portion of the flexible printed circuit board during the slide-in movement of the tray.

In view of the above, the challenge the present invention is to solve is thus to prevent an flexible printed circuit board of an optical disc apparatus from being caught between the bottom case of the apparatus and the bottom cover of the moving unit of the apparatus during the slide-in movement of the tray even if a simplified flexible printed circuit board is used as the above flexible printed circuit board, which connects a printed circuit board provided on the moving unit which includes the tray to a printed circuit board provided on the fixed unit of the apparatus.

Also, one of the objects of the present invention is to solve the above challenge and thereby to provide a thin, highly reliable optical disc apparatus.

In those respects, the present invention is effective: it can solve the above challenge and achieve the above object.

Specifically, the invention is an optical disc apparatus that uses a flexible printed circuit board to connect a printed circuit board provided on the moving unit of the apparatus which includes the tray to a printed circuit board provided on the fixed unit of the apparatus, wherein convex portions are provided on the inner surface of the top cover that covers the top surface side of the apparatus such that the convex portions are directly opposite or directly above the flexible printed circuit board during the slide-in/slide-out movements of the tray and such that the convex portions are positioned further outwardly from the outer circumference of an optical disc with respect to the rotation center of the optical disc upon completion of the slide-in movement of the tray, and, when the part of the flexible printed circuit board comes into contact with the inner surface of the top cover during the slide-in movement of the tray, the convex portions guide or slide part of the flexible printed circuit board along the tip end surfaces of the convex portions in the direction of the slide-in movement of the tray.

BRIEF DESCRIPTION OF THE DRAWINGS

FIG. 8 is a cross-sectional view of the optical disc apparatus of FIG. 1 with the flexible printed circuit board and the top cover in contact with each other.

DETAILED DESCRIPTION OF THE PREFERRED EMBODIMENT

A preferred embodiment of the present invention is described below with reference to the accompanying drawings.

Figure 1:
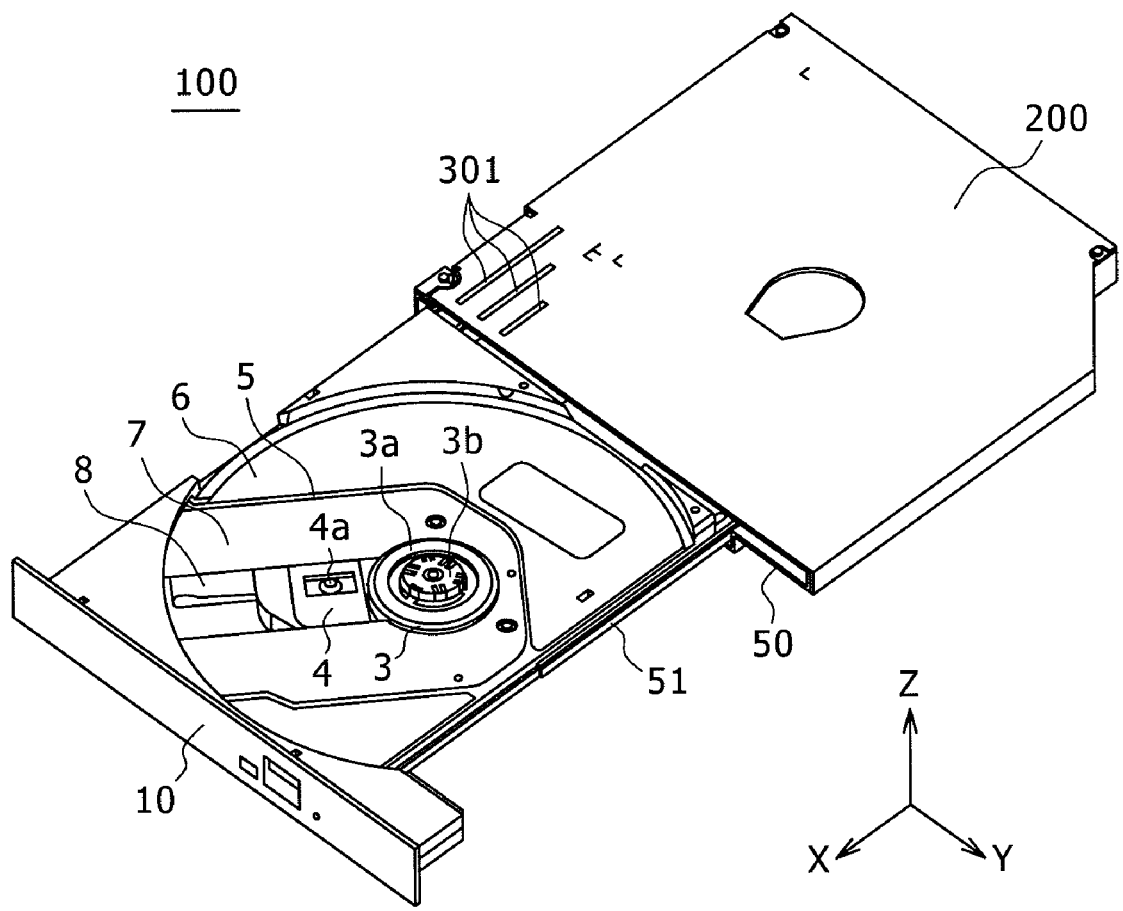
FIG. 1 is a configuration diagram of an optical disc apparatus according to the present embodiment of the present invention.
Figure 2:
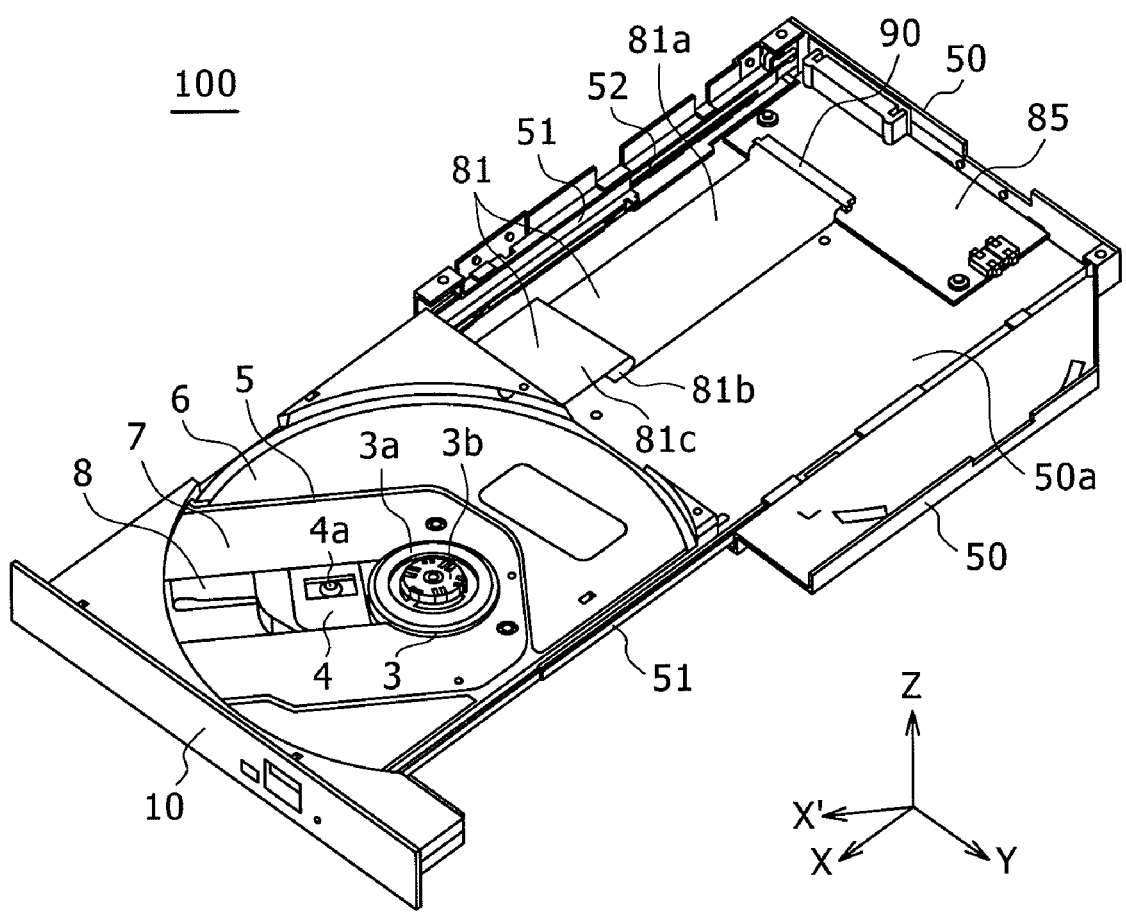
FIG. 2 is a perspective view illustrating the optical disc apparatus of FIG. 1 without its top cover.
Figure 3:
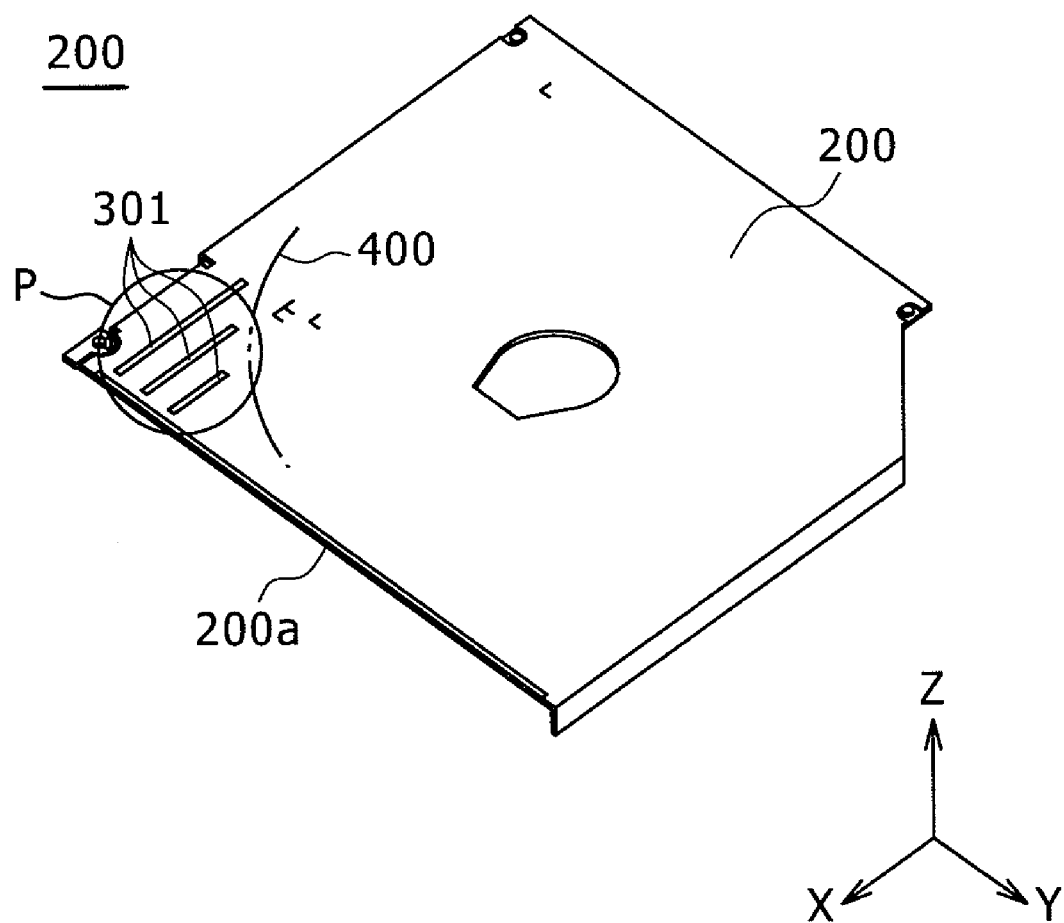
FIG. 3 is a perspective view illustrating the top cover of the optical disc apparatus of FIG. 1.
Figure 4A:
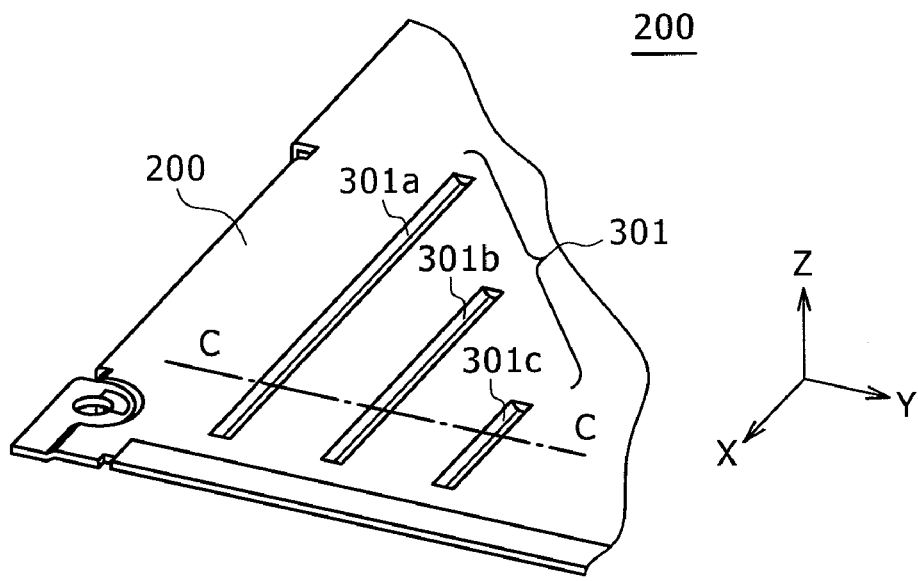
FIGS. 4A and 4B are enlarged views illustrating the essential parts of the top cover shown in FIG. 3.
Figure 4B:
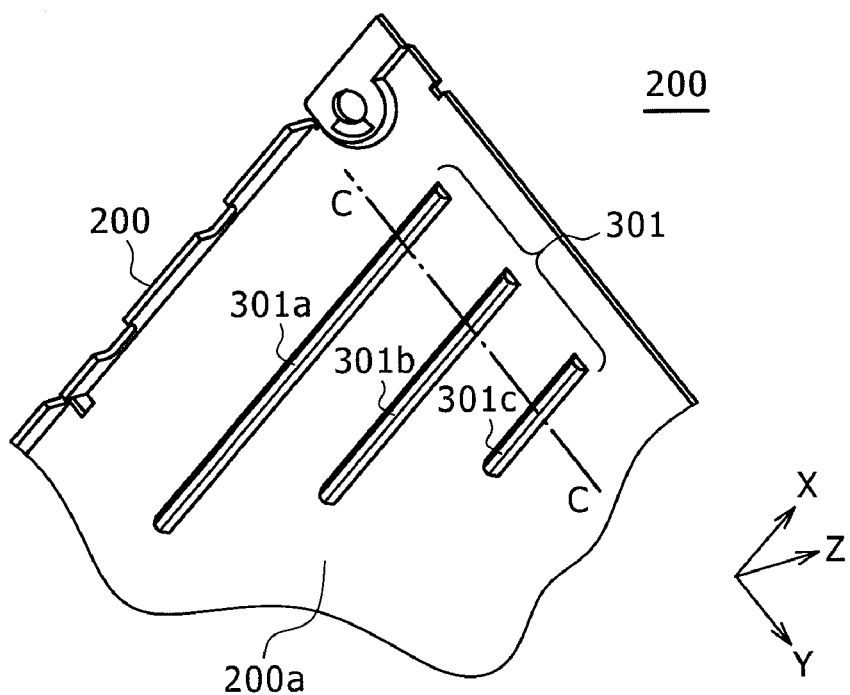
Figure 5:
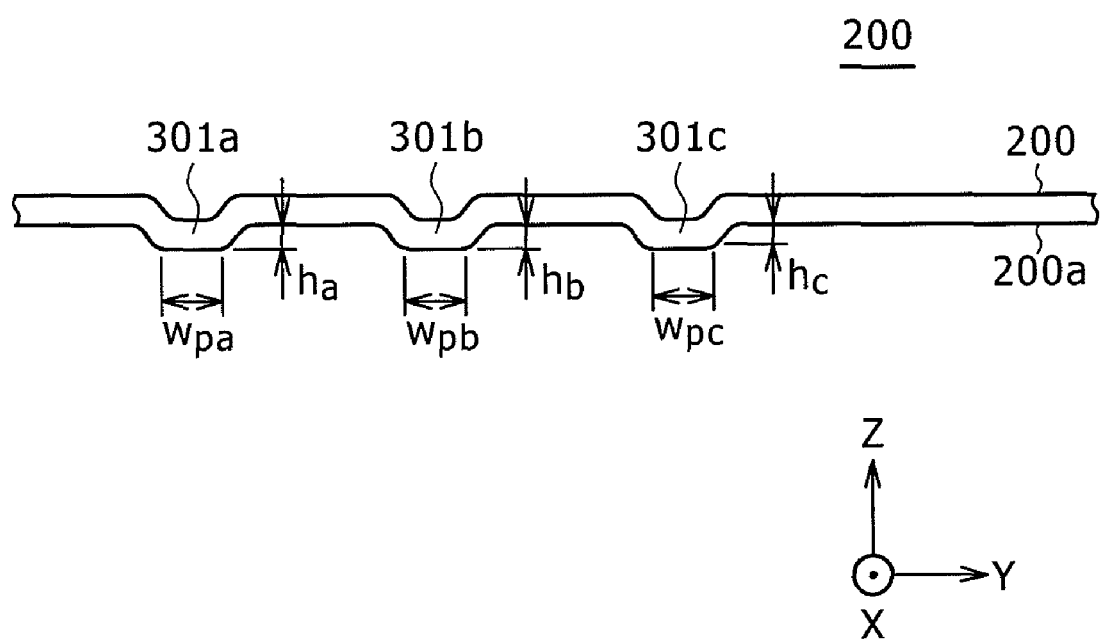
FIG. 5 is a cross-sectional view illustrating the essential parts of the top cover shown in FIG. 3.
Figure 6:
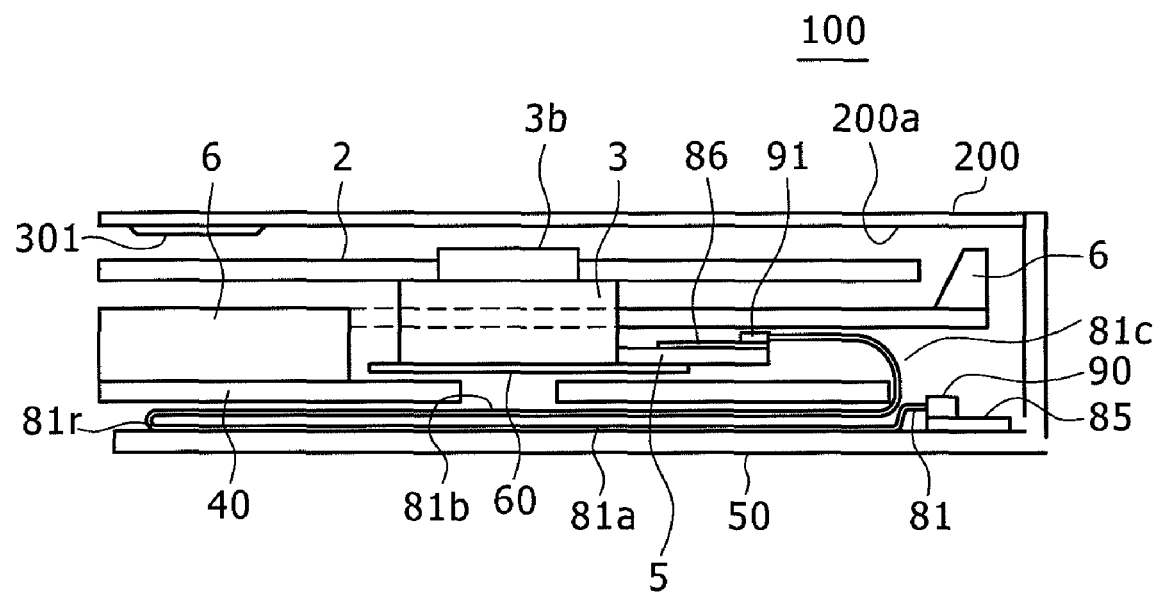
FIG. 6 is a cross-sectional configuration diagram schematically illustrating the optical disc apparatus of FIG. 1 when a tray is inside the housing of the apparatus with an optical disc.
Figure 7:
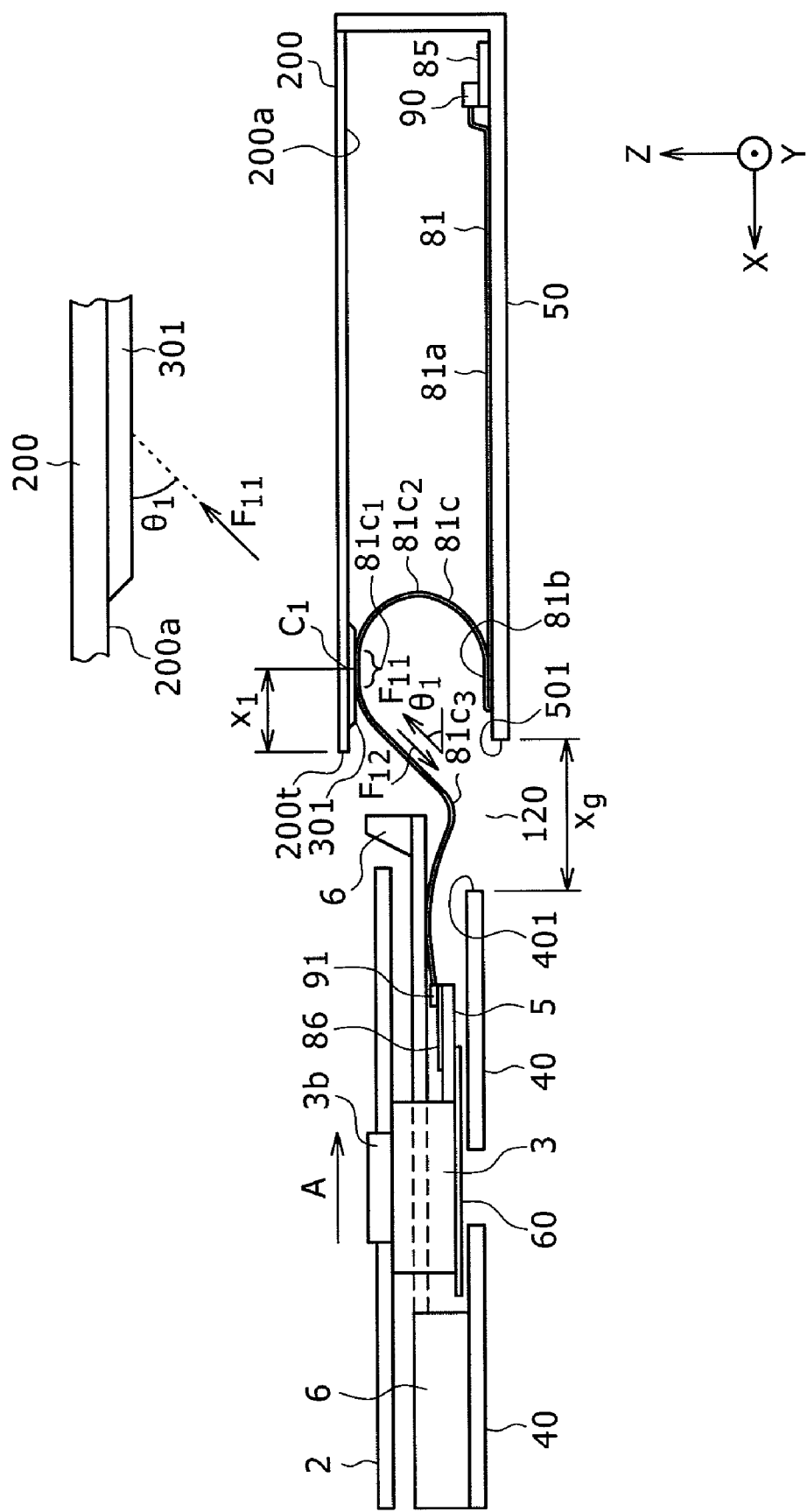
FIG. 7 is a diagram illustrating a state of a flexible printed circuit board of the optical disc apparatus of FIG. 1 during the movement of the tray into the housing.
Figure 9:
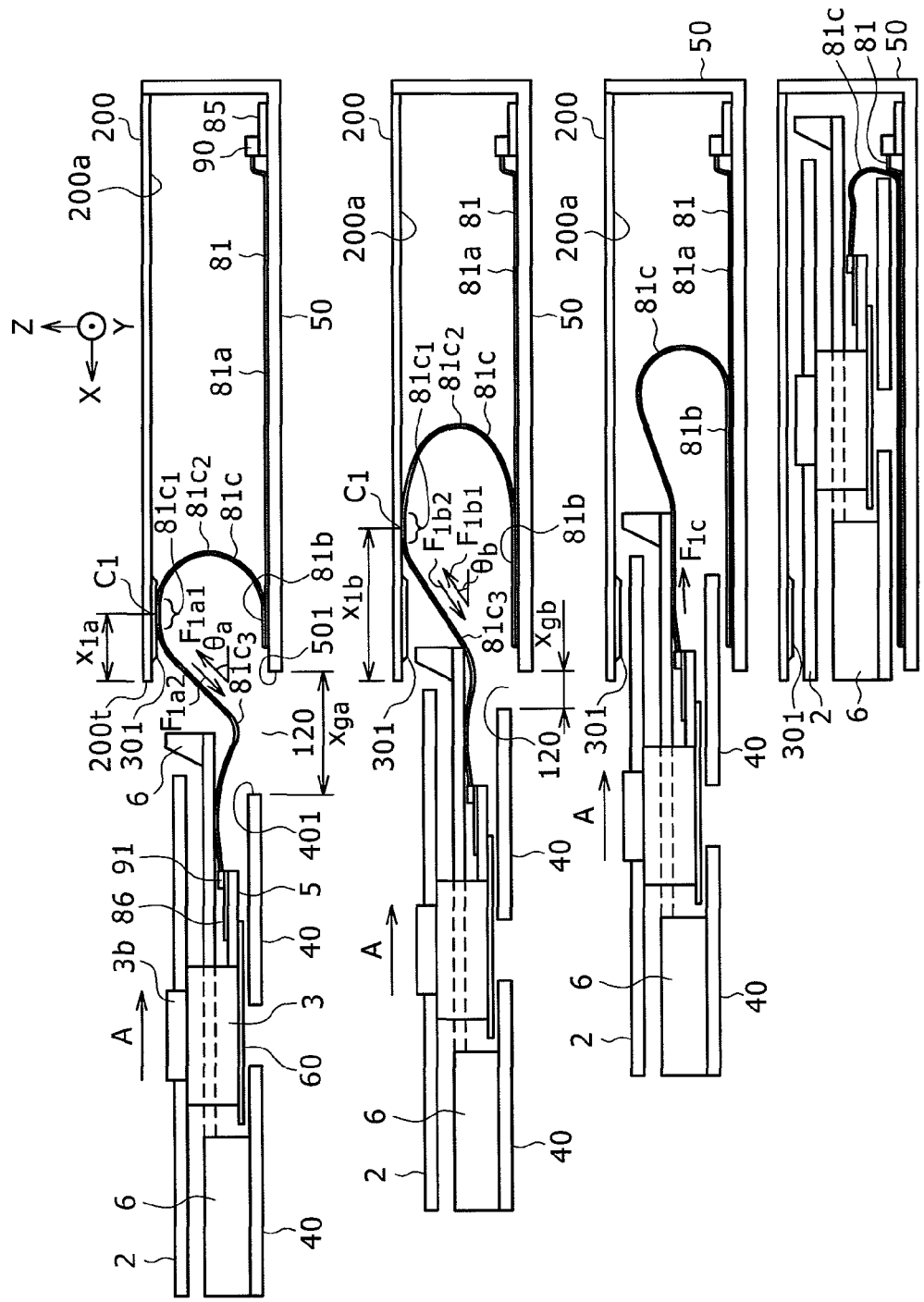
FIGS. 9A to 9D are diagrams illustrating the states of the flexible printed circuit board of the optical disc apparatus of FIG. 1 when the board changes its shape with the movement of the tray into the housing.
Figure 10:
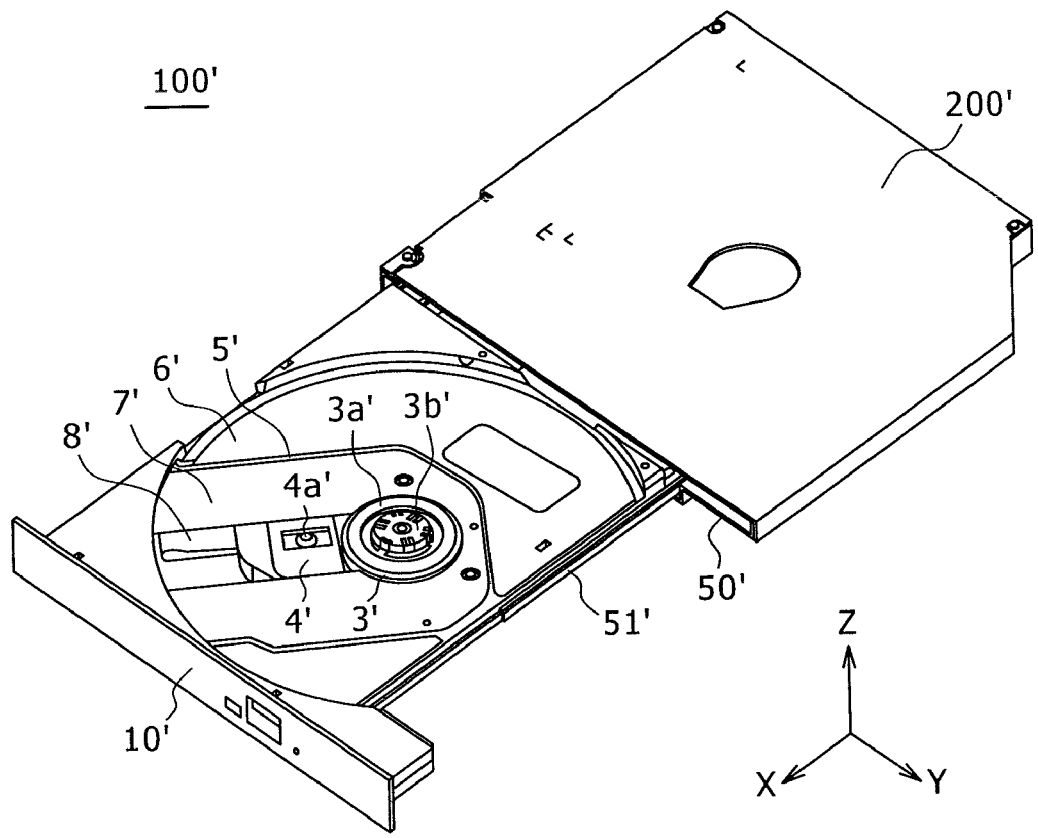
FIG. 10 is a diagram illustrating the configuration of the top surface side of a conventional optical disc apparatus.
Figure 11:
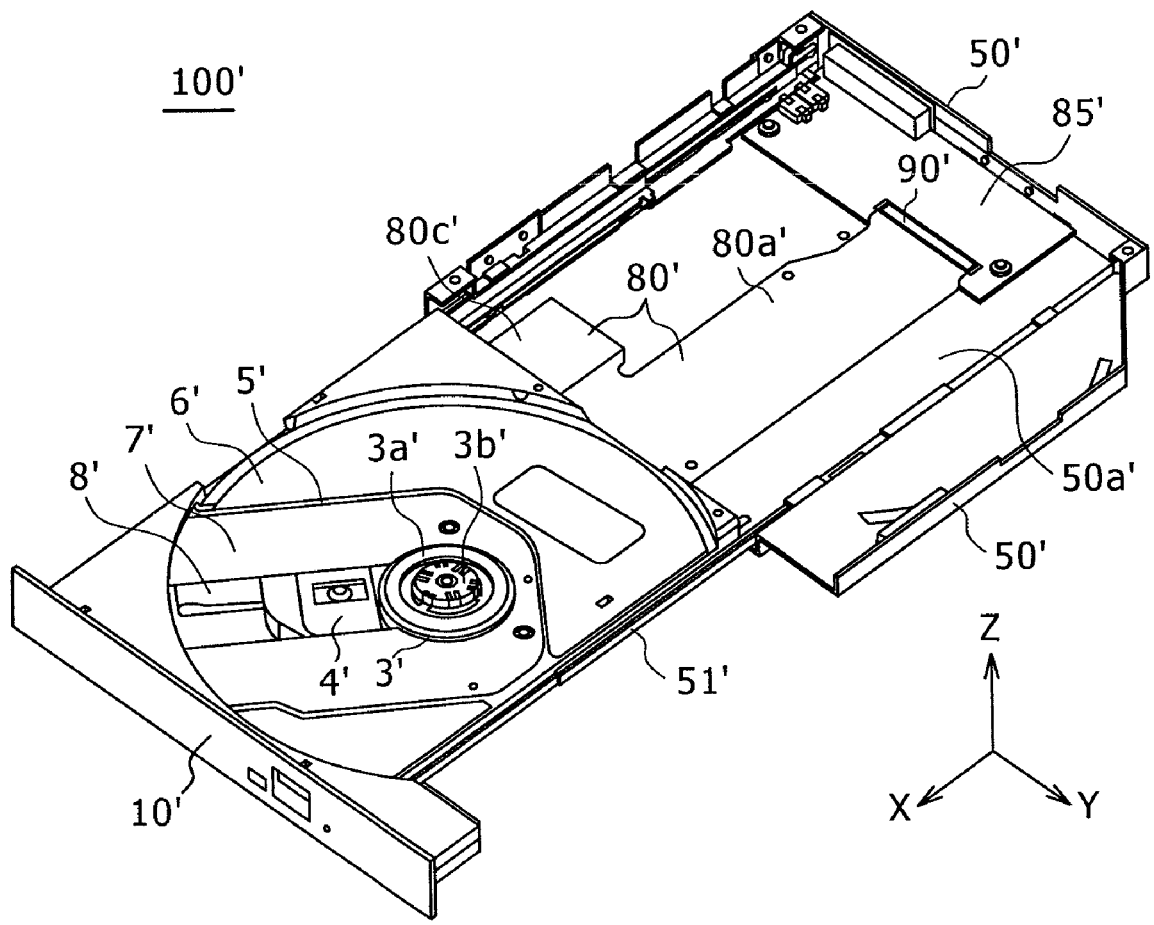
FIG. 11 is a diagram illustrating the conventional optical disc apparatus without its top cover.
Figure 12:
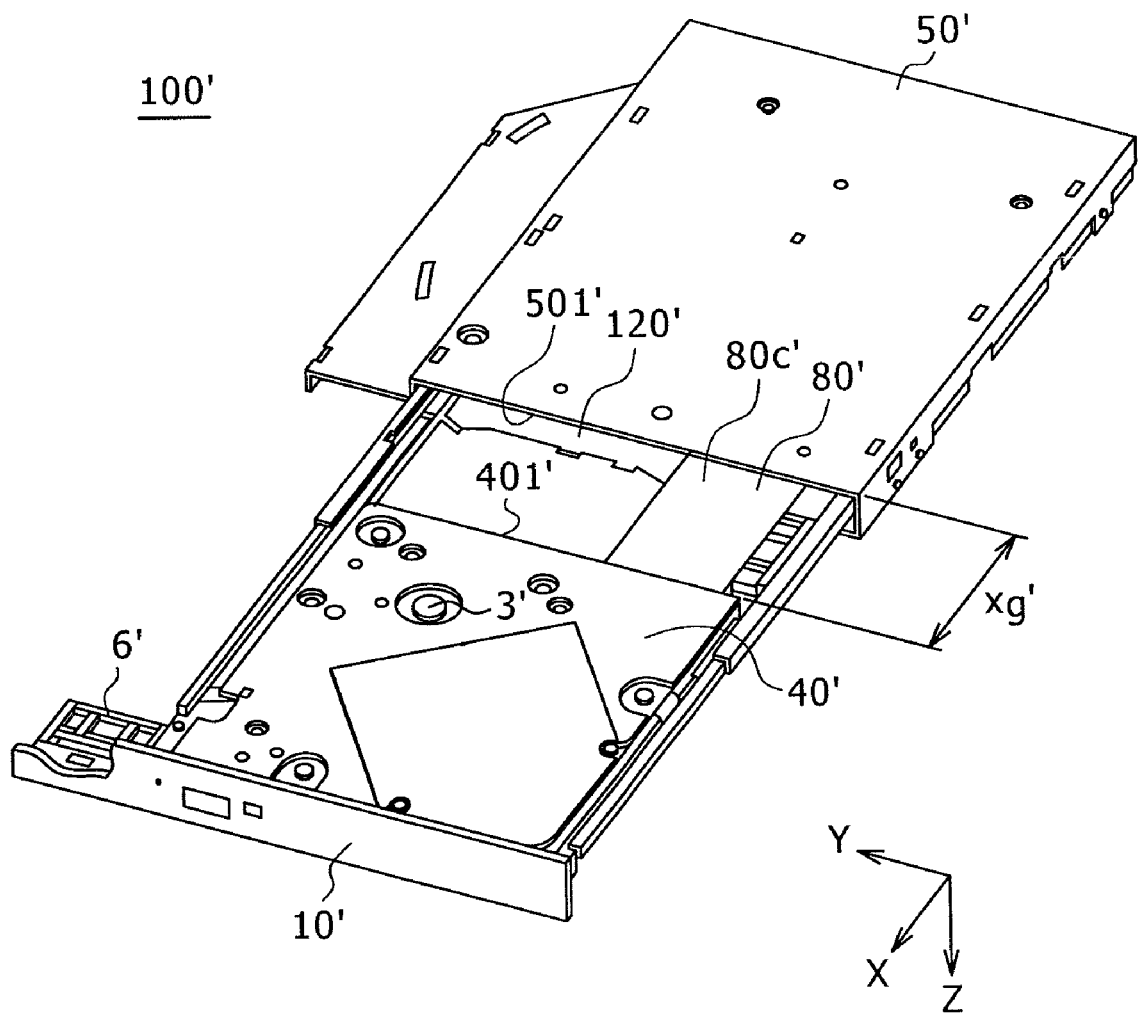
FIG. 12 is a perspective view illustrating the configuration of the bottom surface side of the conventional optical disc apparatus.
Figures 13A, 13B, 13C:
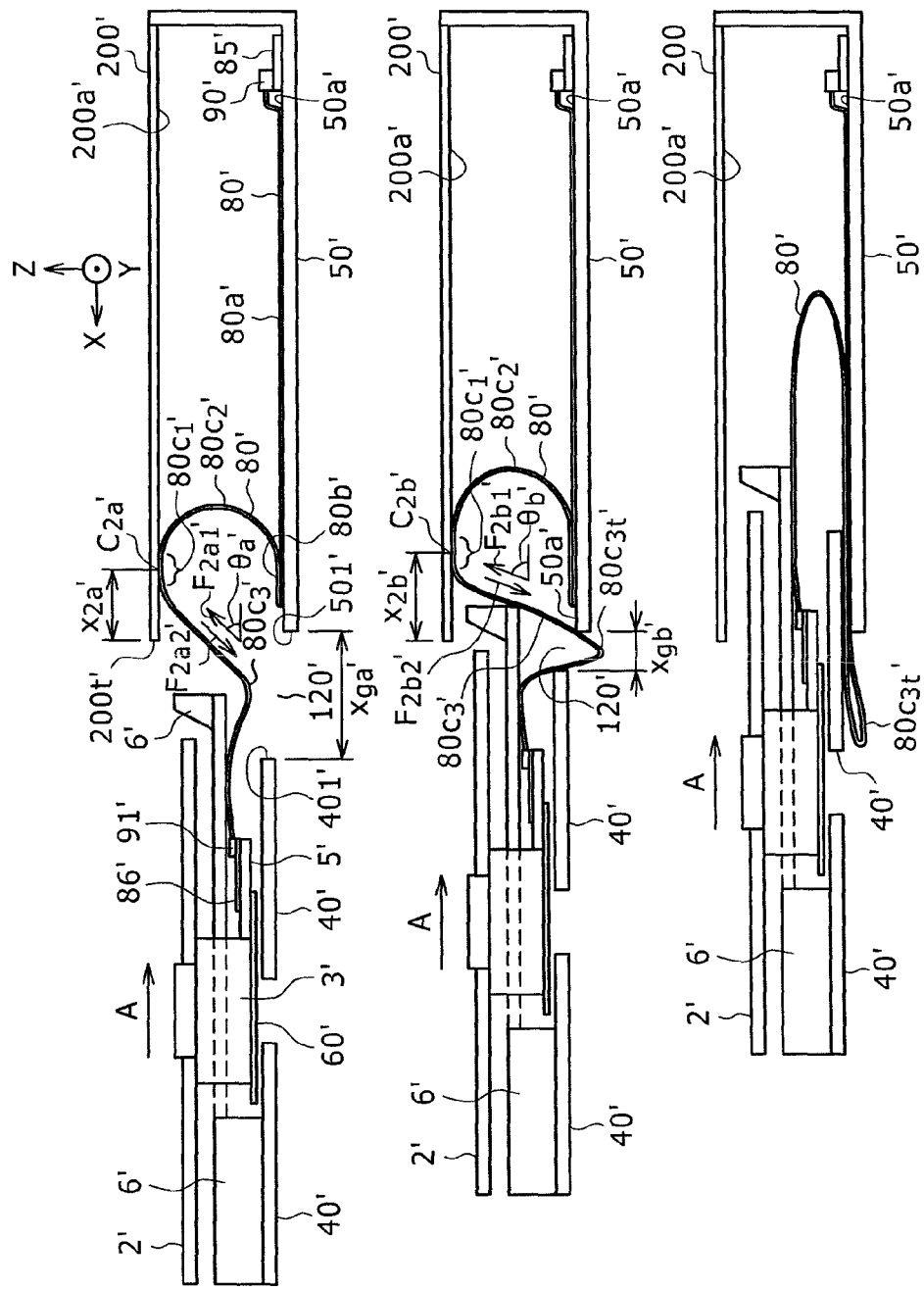
FIGS. 13A to 13C are diagrams illustrating the states of a flexible printed circuit board of the conventional optical disc apparatus when the board changes its shape with the movement of a tray into the housing of the apparatus.
Figure 14:
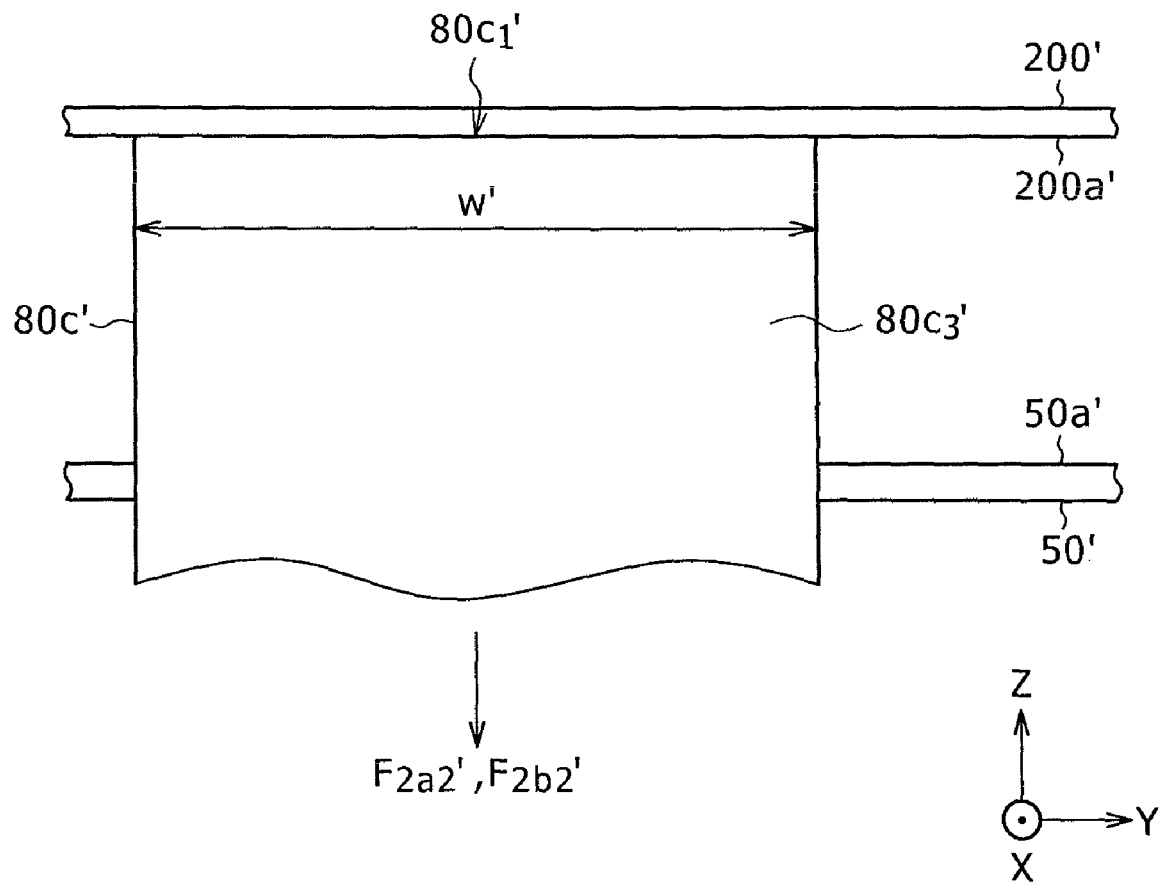
FIG. 14 is a diagram illustrating the conventional optical disc apparatus with the flexible printed circuit board and the top cover in contact with each other during the movement of the tray into the housing.

FIGS. 1 to 9 are diagrams illustrating the embodiment of the invention. FIG. 1 is a configuration diagram of an optical disc apparatus according to the present embodiment of the present invention, illustrating in perspective a tray slid out from the housing of the apparatus. FIG. 2 is a perspective view illustrating the optical disc apparatus of FIG. 1 without its top cover. FIG. 3 is a perspective view illustrating the top cover of the optical disc apparatus of FIG. 1. FIGS. 4A and 4B are enlarged views illustrating the essential parts of the top cover shown in FIG. 3. FIG. 5 is a cross-sectional view illustrating the essential parts of the top cover shown in FIG. 3. FIG. 6 is a cross-sectional configuration diagram schematically illustrating the optical disc apparatus of FIG. 1 when the tray is inside the housing with an optical disc. FIG. 7 is a diagram illustrating a state of a flexible printed circuit board of the optical disc apparatus of FIG. 1 during the movement of the tray into the housing. FIG. 8 is a cross-sectional view of the optical disc apparatus of FIG. 1 with the flexible printed circuit board and the top cover in contact with each other. FIGS. 9A to 9D are diagrams illustrating the states of the flexible printed circuit board of the optical disc apparatus of FIG. 1 when the board changes its shape with the movement of the tray into the housing.

Referring to FIGS. 1 and 2, a thin optical disc apparatus 100 according to the present embodiment of the present invention includes: a disc motor 3 (not illustrated); a turntable 3a; a clamper 3b; an optical pickup 4; and an objective lens 4a. The disc motor 3 rotates an optical disc, or a recording medium (not illustrated). The clamper 3b holds the optical disc. The optical pickup 4 radiates a laser beam onto the optical disc and receives the light reflected by the disc.

The optical pickup 4 is moved approximately in the radially inward/outward directions of the optical disc (the ±X directions in FIG. 1) by a pickup transfer mechanism (not illustrated). The pickup transfer mechanism structurally includes a leadscrew member (not illustrated) with a screw attached on its surface for moving the optical pickup 4 using the torque of the screw; a guide member (not illustrated) for guiding the optical pickup 4; a drive motor (not illustrated) for rotationally driving the leadscrew member; and the like.

Further, the thin optical disc apparatus 100 according to the present embodiment of the present invention includes: a chassis 5; a tray 6; and a front panel 10. The chassis 5 installs thereon the optical pickup 4, the pickup transfer mechanism, the disc motor 3, and the like. The tray 6, coupled to the chassis 5, slides into and out of the optical disc apparatus 100 for loading the optical disc into and unloading the disc from the apparatus. The front panel 10 is coupled to the tray 6.

The disc motor 3 is coupled to the chassis 5 via a flat motor fixing plate. In other words, the disc motor 3 is fixed to the motor fixing plate, and the motor fixing plate is fixed to the chassis 5. The optical pickup 4, pickup transfer mechanism, disc motor 3, chassis 5, and motor fixing plate collectively constitute a mechanical unit (moving unit) of the optical disc apparatus 100. The chassis 5 forms the outer portion of the mechanical unit as a framework of the unit. Provided below the motor fixing plate (in the −Z direction) is a bottom cover fixed to the surface of the tray 6 which is opposite the disc placing surface of the tray 6, with the bottom cover approximately plane-parallel to the motor fixing plate (the bottom cover not illustrated). The chassis 5 is connected to the tray 6 at several points via vibration insulators. In other words, the mechanical unit is connected to the tray 6 by the chassis 5, part of the mechanical unit, being connected to the tray 6 at several points of the apparatus via vibration insulators. Further, the bottom cover, which is fixed to the surface of the tray 6 which is opposite the disc placing surface (this surface opposite the disc placing surface being the surface of the tray 6 which faces the −Z direction), covers the −Z-directional side of the mechanical unit.

Referring again to FIGS. 1 and 2, the thin optical disc apparatus 100 according to the present embodiment of the present invention further includes: a cover 7; a flexible printed circuit board 8; and a bottom case 50. The cover 7 covers the top surface side of the mechanical unit (the top surface being the surface facing the Z direction). The flexible printed circuit board 8 (often abbreviated to 'FPC') connects the optical pickup 4 and a printed circuit board (not illustrated) on the mechanical unit. The bottom case 50 is disposed further in the −Z direction from the bottom cover to cover the bottom surface side of the optical disc apparatus 100.

Referring again to FIG. 1, the thin optical disc apparatus 100 according to the present embodiment of the present invention further includes: a top cover 200 and convex portions 301. The top cover 200 is disposed on the disc-placing-surface side of the tray (the Z-directional side) to form the top surface of the apparatus. The convex portions 301 are formed on the top cover 200 and project toward the inner space of the apparatus.

These convex portions 301, in the present embodiment, are of structures produced by machine pressing and therefore are at the same time concave portions when viewed from the outer surface side of the top cover 200 (the outer surface being opposite the inner surface that faces the inner space of the apparatus). The top cover 200 and the bottom case 50 constitute a housing of the apparatus.

Referring again to FIG. 2, the thin optical disc apparatus 100 according to the present embodiment of the present invention further includes: an inner surface 50a of the bottom case 50; a rail member 51; a guide rail member 52; a main printed circuit board 85; a connector 90; and a flexible printed circuit board 81. The rail member 51 slidably engages with the outer side of a side end of the tray 6 and moves in the ±X directions with the slide-in/slide-out movements of the tray 6. The guide rail member 52 engages with the outer side of the rail member 51 and guides this rail member 51 during the slide-in/slide-out movements of the tray 6. The main printed circuit board 85, or a first printed circuit board, is fixed to the inner surface 50a of the bottom case 50 and installs thereon an interface circuit for connection to an external host computer and the like. The flexible printed circuit board 81 connects a second printed circuit board (not illustrated) fixed to the chassis 5 to the main printed circuit board 85.

The flexible printed circuit board 81 is band-shaped, having a first face 81a fixed to the inner surface 50a of the bottom case 50 and a second face 81c that moves with the slide-in/slide-out movements of the tray 6. The flexible printed circuit board 81 also has a face 81b located between the first face 81a and the second face 81c. This face 81b overlaps the first face 81a during the slide-in movement of the tray 6. The second face 81c moves and changes its shape with the slide-in/slide-out movements of the tray 6 into/out of the housing, and its distal end is connected via a connector (not illustrated) to the second printed circuit board on the chassis 5 of the mechanical unit. The first face 81a has its proximal end connected to the main printed circuit board 85 via the connector 90. The second face 81c and the face 81b connected thereto change in area with the slide-in/slide-out movements of the tray 6. Specifically, during the slide-in movement of the tray 6 (−X-directional movement), the second face 81c decreases in area, and the face 81b increases in the area that overlaps the first face 81a. Conversely, during the slide-out movement of the tray 6 (+X-directional movement), the second face 81c increases in area, and the face 81b decreases in area. The first face 81a is fixed to the inner surface 50a of the bottom case 50 by an adhesive or the like. The convex portions 301 are disposed on the surface of the top cover 200 which faces the inner space of the housing such that the convex portions 301 are directly opposite or above the second face 81c during the slide-in/slide-out movements of the tray 6.

Hereinafter, the above-mentioned components of FIGS. 1 and 2 are assigned the same reference numerals as above when used in the explanations that follow.

FIGS. 3, 4A, 4B, and 5 are structural diagrams of the top cover 200 of the optical disc apparatus shown in FIG. 1. Specifically, FIG. 3 is an external view of the top cover 200; FIGS. 4A and 4B are enlarged views illustrating the convex portions 301 provided on the top cover 200; and FIG. 5 is a cross-sectional view illustrating the convex portions 301 of the top cover 200.

Referring to FIG. 3, reference numeral 200a denotes an inner surface of the top cover 200 (that is, the surface facing the −Z-directional side), and reference numeral 400 is a line indicating part of the outer circumference of an optical disc when the disc is inside the apparatus with the tray 6. The convex portions 301 are disposed on the inner surface 200a of the top cover 200 such that they are positioned further outwardly from the line 400 upon completion of the slide-in movement of the tray 6.

FIGS. 4A and 4B are enlarged views of the P section shown in FIG. 3. Specifically, FIG. 4A is an enlarged view of the P section of the top cover 200 when viewed from the outer surface side of the top cover 200, and FIG. 4B is an enlarged view of the same when viewed from the inner surface side of the top cover 200. As shown in FIGS. 4A and 4B, on the inner surface 200a of the top cover 200, a multiple number of the convex portions 301 are provided (in the present embodiment, the number is three) in the width direction of the second face 81c (the Y direction) of the flexible printed circuit board 81, and the convex portions 301 are aligned such that they extend linearly in the movement direction of the tray 6. Reference numerals 301a, 301b, and 301c denote the three convex portions. The three convex portions 301a, 301b, and 301c are of structures produced by machine pressing and are disposed on the inner surface 200a of the top cover 200 such that the convex portions are directly opposite or above the second face 81c during the slide-in/slide-out movements of the tray 6 and such that they are positioned further outwardly from the outer circumference of the optical disc upon completion of the slide-in movement of the tray 6.

FIG. 5 is a cross-sectional view taken along the line c-c of the top cover 200 shown in FIGS. 4A and 4B. The height ha of the convex portion 301a, the height $h_b$ of the convex portion 301b, and the height $h_c$ of the convex portion 301c (the word 'height' refers to the distance between the tip end of a convex portion and the inner surface 200a of the top cover 200) are each in the range from $0.2 \times 10^{-3}$ m to $0.3 \times 10^{-3}$ m. Further, the tip end width $w_{pa}$ of the convex portion 301a, the tip end width $w_{pb}$ of the convex portion 301b, and the tip end width $w_{pc}$ of the convex portion 301c are each in the range from $1 \times 10^{-3}$ m to $2 \times 10^{-3}$ m. These dimensional values are practically appropriate values in terms of ensuring both of the manufacturability and functionality of convex portions 301a, 301b, and 301c.

FIG. 6 is a schematic cross-sectional view taken along the line in the X direction that passes through the rotation center of the disc motor 3 of the optical disc apparatus 100 shown in FIG. 1. Referring to FIG. 6, the tray 6 is inside the housing of the apparatus with an optical disc, and the apparatus is set ready for recording or reproducing operations.

FIG. 6 shows an optical disc 2; a bottom cover 40 that is fixed to the surface of the tray 6 which is opposite the disc placing surface (this surface opposite the disc placing surface being the surface of the tray 6 which faces the −Z direction); a printed circuit board 86 (the second printed circuit board mentioned earlier) that is fixed to the chassis 5 of the mechanical unit and exchanges signals with main printed circuit board 85 (the first printed circuit board) via the flexible printed circuit board 81; a connector 91 provided on the printed circuit board 86; and a folded edge 81r formed between the first face 81a and the face 81b of the flexible printed circuit board 81. The other reference numerals shown in FIG. 6 denote the same components as those in FIGS. 1 to 5. When the tray 6 is inside the housing of the apparatus with the optical disc, the first face 81a, the face 81b, and the folded edge 81r of the flexible printed circuit board 81 are positioned between the bottom cover 40 and the bottom case 50 with those portions of the flexible printed circuit board 81 detached from the lower surface of the bottom cover 40 (that is, the surface of the bottom cover 40 which faces the −Z direction). Also, the convex portions 301 on the top cover 200, at this time, are not located directly opposite the second face 81c of the flexible printed circuit board 81 but located further in the X direction from the second face 81c so that the convex portions 301 are not in contact with the flexible printed circuit board 81. Moreover, the convex portions 301 are located further outwardly from the outer circumference of the optical disc 2 such that the convex portions 301 are not in contact with the optical disc 2.

Hereinafter, the above-mentioned components of FIGS. 3 to 6 are assigned the same reference numerals as above when used in the explanations that follow.

FIG. 7 is a diagram illustrating a state of the flexible printed circuit board 81 when the tray 6 starts to be slid into the optical disc apparatus 100 shown in FIG. 1, more specifically when the tray 6 starts to be slid in the A direction shown in FIG. 7 with the mechanical unit. FIG. 8 is a cross-sectional view illustrating the flexible printed circuit board 81 when in contact with the top cover 200.

FIG. 7 shows the end surface 401 of the bottom cover 40 which faces the −X direction; the end surface 501 of the bottom case 50 which faces the X direction; a clearance 120 between the end surface 401 and the end surface 501 (an X-axis directional dimension $x_g$); and the end surface 200t of the top cover 200 which faces the X direction. Also shown in FIG. 7 are an X-axis directional position $C_1$ which is away from the end surface 200t of the top cover 200 by a distance of $x_1$ and represents a position at which part of the second face 81c of the flexible printed circuit board 81 comes into contact with the convex portions 301 on the inner surface 200a of the top cover 200; a portion $81c_1$ of the second face 81c which comes into contact with the convex portions 301 at the position $C_1$; a portion $81c_2$ of the second face 81c which is closer to the connector 90 than the portion $81c_1$; and a portion $81c_3$ of the second face 81c which is closer to the connector 91 than the portion $81c_1$.

When the tray 6 starts to be slid in the A direction with the mechanical unit, the second face 81c of the flexible printed circuit board 81 changes its shape into a curvature with the positional displacement of the tray 6. Further, the portion $81c_1$ of the second face 81c comes into contact with the convex portions 301 provided on the inner surface 200a of the top cover 200 at the X-axis directional position $C_1$ which is away from the end surface 200t of the top cover 200 by the distance of $x_1$. When the portion $81c_1$ of the second face 81c is in contact with the tip ends of the convex portions 301, the portion $81c_3$ of the second face 81c is pushed from the connector-91 side by the positional displacement of the tray 6 and changes its shape, which causes a force $F_{11}$ having an angle of $\theta_1$ to act on the portion $81c_1$. Thus, the portion $81c_1$ is in contact with the tip ends of the convex portions 301 with the force $F_{11}$ applied thereto. As shown in FIG. 8, the contact areas between the portion $81c_1$ and the tip ends of the convex portions 301 take up only part of the width w of the portion $81c_1$ of the flexible printed circuit board 81 (for example, one fifth to one tenth of the width w of $30 \times 10^{-3}$ m); note that in FIG. 8, flat portions of the flexible printed circuit board 81 which come into contact with the convex portions 301a, 301b, and 301c are represented by $81c_{1a}$, $81c_{1b}$, and $81c_{1c}$, respectively. Therefore, a much smaller frictional force is produced between the portion $81c_1$ and the tip ends of the convex portions 301 than would be produced by the conventional optical disc apparatus 100', which has been described with reference to FIGS. 10 to 14. Consequently, the portion $81c_1$ can slide along the tip ends of the convex portions 301 in the −X direction. At this time, the portion $81c_1$ also receives a reactive force due to the frictional force, and a force $F_{12}$ due to this reactive force, in turn, acts on the portion $81c_3$ of the flexible printed circuit board 81. However, in comparison with the conventional optical disc apparatus 100', the force $F_{12}$ is much smaller than a force acting on the portion $80c_3'$ caused by the frictional force between the inner surface $200a'$ of the top cover $200'$ and the portion $80c_1'$ of the flexible printed circuit board $80'$. This merely means that part of the portion $81c_3$ which is closer to the portion $81c_1$ is only temporarily hindered from moving in the −X direction by the small force $F_{12}$. In the meantime, part of the portion $81c_3$ which is closer to the connector 91 is displaced in the −X direction with the movement of the tray 6. As a result, the portion $81c_3$ slightly slackens in the −Z direction between the part of the portion $81c_3$ which is closer to the portion $81c_1$ and the part of the portion $81c_3$ which is closer to the connector 91 with the progress of the tray 6.

Hereinafter, the above-mentioned components of FIGS. 7 and 8 are assigned the same reference numerals as above when used in the explanations that follow.

FIGS. 9A to 9D are diagrams illustrating the states of the flexible printed circuit board 81 of the optical disc apparatus of FIG. 1 when the board changes its shape with the movement of the tray 6 into the housing.

Specifically, FIG. 9A shows the state of the flexible printed circuit board 81 immediately after the tray 6 starts to be slid into the apparatus; FIG. 9B shows its state when the tray 6 is being slid into the apparatus; FIG. 9C shows its state when the tray 6 is slid further into the apparatus; and FIG. 9D shows its state after completion of the slide-in movement of the tray 6.

Referring to FIG. 9A, immediately after the tray 6 starts to be slid in the A direction with the mechanical unit, the second face $81c$ of the flexible printed circuit board 81 changes its shape into a curvature between the face $81b$ and the connector 91 by the positional displacement of the tray 6. Also, the portion $81c_1$ of the second face $81c$ comes into contact with the convex portions 301 provided on the inner surface $200a$ of the top cover 200 at an X-axis directional position $C_{1a}$ which is away from the end surface $200t$ of the top cover 200 by a distance of $x_{1a}$. In the state shown in FIG. A, or when the portion $81c_1$ of the flexible printed circuit board 81 is in contact with the tip ends of the convex portions 301 provided on the inner surface $200a$ of the top cover 200, the portion $81c_3$ is pushed from the connector-91 side by the positional displacement of the tray 6 and changes its shape, which causes a force $F_{1a1}$ having an angle of $\theta_a$ to act on the portion $81c_1$. Thus, the portion $81c_1$ is in contact with the tip ends of the convex portions 301 at the position $C_{1a}$ with the force $F_{1a1}$ applied to the portion $81c_1$. As shown in FIG. 8, the contact areas between the portion $81c_1$ and the tip ends of the convex portions 301 take up only part of the width w of the portion $81c_1$ (for example, one fifth to one tenth of the width w). Therefore, a much smaller frictional force is produced between the portion $81c_1$ and the tip ends of the convex portions 301. Consequently, the portion $81c_1$ can slide along the tip ends of the convex portions 301 in the −X direction. At this time, the portion $81c_1$ also receives a reactive force due to the frictional force, and a force $F_{1a2}$ due to this reactive force, in turn, acts on the portion $81c_3$. Accordingly, with the progress of the tray 6, the force $F_{1a2}$ temporarily hinders part of the portion $81c_3$ which is closer to the portion $81c_1$ from moving in the −X direction. In the meantime, part of the portion $81c_3$ which is closer to the connector 91 is displaced in the −X direction with the movement of the tray 6. As a result, the portion $81c_3$ slightly slackens in the −Z direction between the part of the portion $81c_3$ which is closer to the portion $81c_1$ and the part of the portion $81c_3$ which is closer to the connector 91 with the slide-in movement of the tray 6 (−X-directional movement). Since the amount of the slack is small, the slack never protrudes from the clearance 120 (an X-axis directional dimension $x_{ga}$) between the end surface 501 of the bottom case 50 and the end surface 401 of the bottom cover 40. In the optical disc apparatus 100 according to the present embodiment of the present invention, the amount of the slack gradually decreases with the progress of the slide-in movement of the tray 6.

After the state shown in FIG. 9A, the tray 6 is slid further into the apparatus with the portion $81c_1$ of the flexible printed circuit board 81 in contact with the tip ends of the convex portions 301. However, after the portion $81c_1$ reaches the −X-directional edges of the convex portions 301, the portion $81c_1$ starts to detach itself from the convex portions 301. With the further progress of the tray 6, the portion $81c_1$ then comes into contact with the inner surface $200a$ of the top cover 200, as shown in FIG. 9B. In the state shown in FIG. 9B, the portion $81c_1$ of the flexible printed circuit board 81 is in contact with the inner surface $200a$ of the top cover 200 at an X-axis directional position $C_{1b}$ which is away from the end surface $200t$ of the top cover 200 by a distance of $x_{1b}$. This means that, with the positional displacement of the tray 6, the position of the portion $81c_1$ changes not only in the second face $81c$ but also relative to the top cover 200. Note that the above-mentioned distance $x_{1b}$ is much larger than the distance $x_{1a}$ shown in FIG. 9A. In the state shown in FIG. 9B, or when the portion $81c_1$ of the flexible printed circuit board 81 is in contact with the inner surface $200a$ of the top cover 200, the portion $81c_3$ applies a force $F_{1b1}$ at an angle of $\theta_b$ ($\theta_b < \theta_a$) to the portion $81c1$. In other words, the portion $81c_1$ is in contact with the inner surface $200a$ of the top cover 200 at the position $C_{1b}$ with the force $F_{1b1}$ applied to the portion $81c$. Because the above contact is made at the position $C_{1b}$ which is −X-directionally away from the position $C_{1a}$ and also because the force $F_{1b1}$ acts at the angle $\theta_b$ smaller than the angle $\theta_a$, a much smaller frictional force results between the portion $81c_1$ and the inner surface $200a$ of the top cover 200 than in the state of FIG. 9A. Thus, the portion $81c_1$ slides more easily along the inner surface $200a$ of the top cover 200. At this time, the portion $81c_1$ also receives a reactive force due to the small frictional force, and a force $F_{1b2}$ due to this reactive force, in turn, acts on the portion $81c_3$. Accordingly, with the progress of the tray 6, the force $F_{1b2}$ temporarily hinders part of the portion $81c_3$ which is closer to the portion $81c_1$ from moving in the −X direction. In the meantime, part of the portion $81c_3$ which is closer to the connector 91 is displaced in the −X direction with the movement of the tray 6. As a result, the portion $81c_3$ slightly slackens in the −Z direction between the part of the portion $81c_3$ which is closer to the portion $81c_1$ and the part of the portion $81c_3$ which is closer to the connector 91 with the slide-in movement of the tray 6 (−X-directional movement). Since the force $F_{1b2}$ is smaller than the force $F_{1a2}$ in the state of FIG. 9A, the amount of the slack is also smaller than in the state of FIG. 9A. Thus, in the state of FIG. 9B, too, the slack never protrudes from the clearance 120 (an X-axis directional dimension $x_{gb}$) between the end surface 501 of the bottom case 50 and the end surface 401 of the bottom cover 40. The amount of the slack decreases further with the progress of the slide-in movement of the tray 6.

After the tray 6 slides further into the apparatus from the state shown in FIG. 9B, the state shown in FIG. 9C results. In this state of FIG. 9C, the ±X-directional clearance 120 does not exist between the end surface 501 of the bottom case 50 and the end surface 401 of the bottom cover 40, resulting in an overlap (but not in contact) between the X-directional side of the bottom case 50 and the −X-directional side of the bottom cover 40 when viewed from the ±Z directions. Also, the second face $81c$ of the flexible printed circuit board 81 is released from the contact with the inner surface $200a$ of the top cover 200, and the frictional force due to the contact with the inner surface $200a$ and the reactive force no longer act on the second face $81c$. Furthermore, as shown in FIG. 9C, part of the first face $81a$, part of the face $81b$, and part of the second face $81c$ of the flexible printed circuit board 81 are positioned between the bottom cover 40 and the bottom case 50, thereby preventing the second face 81c from being displaced upward (in the Z direction).

When the slide-in movement of the tray 6 is completed after the state of FIG. 9C, the state shown in FIG. 9D results, in which recording or reproducing operations can be performed. In this state of FIG. 9D, the whole part of the first face 81a and the whole part of the face 81b of the flexible printed circuit board 81 are positioned between the bottom cover 40 and the bottom case 50, and the whole part of the second face 81c is positioned in a clearance between the tray 6 and the bottom case 50. Also, the convex portions 301 on the inner surface 200a of the top cover 200 are positioned further outwardly from the outer circumference of the optical disc 2; thus, the convex portions 301 never touch the optical disc 2.

In accordance with the thus-configured above optical disc apparatus 100, the flexible printed circuit board 81 can be prevented from being caught between the bottom case 50 and the bottom cover 40 during the slide-in movement of the tray 6, and a thin, highly reliable structure can be achieved. The thickness of the apparatus can be reduced to $9.5 \times 10^{-3}$ m or less. When the flexible printed circuit board 81 is thicker, wider, or made of harder material, it becomes higher in rigidity and lower in flexibility. In such cases, too, the optical disc apparatus 100 does ensure the above advantages and effects. Therefore, a low-cost flexible printed circuit board can also be used for the apparatus.

In the above optical disc apparatus 100 according to the present embodiment, the convex portions 301 on the inner surface 200a of the top cover 200 each have a flat tip end surface when viewed in cross section, as shown in FIGS. 5 and 8. However, the present invention is not limited to the above: each of the convex portions 301 can instead have a curved tip end surface. Further, although the convex portions 301 are structurally designed to protrude from the flat inner surface 200a of the top cover 200 in the above optical disc apparatus 100, concave portions as well as convex portions may be provided on the inner surface 200a of the top cover 200 such that the convex portions protrude with respect to the concave portions. Moreover, in the above optical disc apparatus 100, the printed circuit board (the second printed circuit board) provided on the mechanical unit (moving unit) of the apparatus is fixed to the chassis 5; however, the present invention is not limited to the above. That printed circuit board may instead be fixed to the tray 6, for example. Furthermore, the flexible printed circuit board 81 in the above optical disc apparatus 100 is intended to include flexible flat cables or the like.

The present invention can be implemented in various forms other than the above-described embodiment without departing from the spirit and scope of the invention. Therefore, the above-described embodiment is to be regarded as illustrative in nature, not as restrictive. The scope of the present invention is defined only by the appended claims. Further, the invention is intended to cover changes and modifications within the scope as defined by the claims and within an equivalent scope thereof.

What is claimed is:

1. An optical disc apparatus for recording information onto and reproducing information from an optical disc, the apparatus comprising:
    an optical pickup device for radiating a laser beam onto the optical disc and receiving the light reflected by the optical disc;
    a pickup transfer mechanism for moving the optical pickup device substantially in the radially inward and outward directions of the optical disc;
    a disc motor for rotationally driving the optical disc;
    a chassis for mounting thereon the optical pickup device, the pickup transfer mechanism, and the disc motor;
    a tray coupled to the chassis, the tray adapted to load the optical disc into the apparatus by the slide-in movement of the tray into the apparatus and to unload the optical disc from the apparatus by the slide-out movement of the tray from the apparatus;
    a bottom cover fixed to the surface of the tray which is opposite the disc placing surface of the tray;
    a bottom case disposed further outwardly from the bottom cover so as to cover the bottom surface side of the apparatus;
    a first circuit board fixed to the inner surface of the bottom case and on which is mounted an interface circuit for connection with an external host computer;
    a second circuit board which is fixed to either the tray or the chassis and connected to the first circuit board;
    a flexible circuit board for electrically connecting the first and second circuit boards, the flexible circuit board having a first face fixed to the inner surface of the bottom case and a second face which moves with the slide-in/slide-out movements of the tray; and
    a top cover disposed on the disc placing side with respect to the tray so as to cover the top surface side of the apparatus, the top cover having a convex portion which protrudes toward the inner space of the apparatus, the convex portion being disposed on the inner surface of the top cover such that the convex portion is directly opposite or directly above the second face of the flexible circuit board during the slide-in/slide-out movements of the tray and such that the convex portion is positioned further outwardly from the outer circumference of the optical disc with respect to the rotation center of the optical disc upon completion of the slide-in movement of the tray,
    wherein the convex portion guides or slides the second face of the flexible circuit board along the tip end surface of the convex portion in the direction of the slide-in movement of the tray when the second face of the flexible circuit board comes into contact with the inner surface of the top cover during the slide-in movement of the tray.

2. The optical disc apparatus defined in claim 1, wherein a plurality of convex portions of the type defined in claim 1 are provided on the inner surface of the top cover in the width direction of the second face of the flexible circuit board, and each of the plurality of convex portions extends linearly in the same direction as that of the slide-in/slide-out movements of the tray.

3. The optical disc apparatus defined in claim 2, wherein the plurality of convex portions on the inner surface of the top cover are of structures formed by machine pressing.

4. The optical disc apparatus defined in claim 2, wherein the heights of the tip end surfaces of the plurality of convex portions from the inner surface of the top cover are each in the range from $0.2 \times 10^{-3}$ m to $0.3 \times 10^{-3}$ m.

5. The optical disc apparatus defined in claim 1, wherein the convex portion on the inner surface of the top cover is of a structure formed by machine pressing.

6. The optical disc apparatus defined in claim 1, wherein the height of the tip end surface of the convex portion from the inner surface of the top cover is in the range from $0.2 \times 10^{-3}$ m to $0.3 \times 10^{-3}$ m.

* * * * *